US008871367B2

(12) United States Patent
Kato

(10) Patent No.: US 8,871,367 B2
(45) Date of Patent: Oct. 28, 2014

(54) PERPENDICULAR MAGNETIC RECORDING MEDIUM

(75) Inventor: Hisato Kato, Hachioji (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 442 days.

(21) Appl. No.: 13/064,208

(22) Filed: Mar. 10, 2011

(65) Prior Publication Data

US 2011/0244269 A1 Oct. 6, 2011

(30) Foreign Application Priority Data

Mar. 17, 2010 (JP) ................................. 2010-061141
Sep. 28, 2010 (JP) ................................. 2010-217511

(51) Int. Cl.
G11B 5/66 (2006.01)
G11B 5/73 (2006.01)
G11B 5/738 (2006.01)

(52) U.S. Cl.
CPC .............. *G11B 5/7325* (2013.01); *G11B 5/738* (2013.01); *G11B 5/66* (2013.01)
USPC .......................... 428/828; 428/828.1; 428/829

(58) Field of Classification Search
None
See application file for complete search history.

(56) References Cited

U.S. PATENT DOCUMENTS

| | | | | |
|---|---|---|---|---|
| 5,736,262 | A * | 4/1998 | Ohkijima et al. | 428/611 |
| 5,922,442 | A * | 7/1999 | Lal et al. | 428/831 |
| 6,007,924 | A * | 12/1999 | Lal et al. | 428/828.1 |
| 6,645,647 | B1 * | 11/2003 | Litvinov et al. | 428/830 |
| 6,890,667 | B1 * | 5/2005 | Lairson et al. | 428/611 |
| 7,074,508 | B2 * | 7/2006 | Ajan | 428/829 |
| 7,368,187 | B2 * | 5/2008 | Okuyama et al. | 428/836.1 |
| 7,399,540 | B2 * | 7/2008 | Futamoto et al. | 428/828.1 |
| 7,592,079 | B1 * | 9/2009 | Acharya et al. | 428/827 |
| 2002/0058160 | A1 | 5/2002 | Oikawa et al. | |
| 2002/0182446 | A1 | 12/2002 | Takenoiri et al. | |
| 2004/0013909 | A1 | 1/2004 | Shimizu et al. | |
| 2004/0061973 | A1 * | 4/2004 | Crue et al. | 360/126 |
| 2006/0269792 | A1 * | 11/2006 | Fullerton et al. | 428/828 |
| 2007/0188924 | A1 * | 8/2007 | Tamai et al. | 360/135 |
| 2007/0230052 | A1 * | 10/2007 | Ajan et al. | 360/131 |
| 2007/0231609 | A1 * | 10/2007 | Ajan et al. | 428/828.1 |
| 2007/0254189 | A1 * | 11/2007 | Nakagawa et al. | 428/828.1 |

(Continued)

FOREIGN PATENT DOCUMENTS

| | | |
|---|---|---|
| JP | 2001-101643 A | 4/2001 |
| JP | 2002-100030 A | 4/2002 |
| JP | 2002-298323 A | 10/2002 |
| JP | 2002-358617 A | 12/2002 |
| JP | 2003-123239 A | 4/2003 |
| JP | 2004-054972 A | 2/2004 |
| JP | 2004-288348 A | 10/2004 |
| JP | 2008-117506 A | 5/2008 |

OTHER PUBLICATIONS

Shunji Takenoiri et al., "Development and Issues of CoPtCr—SiO2 Perpendicular Recording Media", pp. 9-16 (2004).

*Primary Examiner* — Kevin Bernatz
(74) *Attorney, Agent, or Firm* — Rabin & Berdo, P.C.

(57) ABSTRACT

A perpendicular magnetic recording medium includes at least a soft-magnetic underlayer, a non-magnetic underlayer, a ferromagnetic intermediate layer, a non-magnetic intermediate layer, and a perpendicular magnetic recording layer sequentially stacked on a non-magnetic substrate. In an embodiment, the ferromagnetic intermediate layer is formed of a CoCr based alloy, a product Bs·t of a saturation magnetic flux density and film thickness of the ferromagnetic intermediate layer is within a range of 0.15 to 3.6 T·nm, and the non-magnetic intermediate layer has a film thickness of 3 nm or more.

9 Claims, 4 Drawing Sheets

(56) References Cited

U.S. PATENT DOCUMENTS

| | | | |
|---|---|---|---|
| 2008/0085425 A1* | 4/2008 | Girt et al. | 428/826 |
| 2008/0096055 A1 | 4/2008 | Takenoiri et al. | |
| 2008/0180843 A1* | 7/2008 | Zhang et al. | 360/135 |
| 2008/0199735 A1* | 8/2008 | Berger et al. | 428/828.1 |
| 2009/0073599 A1* | 3/2009 | Nemoto et al. | 360/77.02 |
| 2009/0195924 A1* | 8/2009 | Nemoto et al. | 360/110 |

* cited by examiner

- 70 — LIQUID LUBRICATION LAYER / PROTECTIVE LAYER
- 60 — PERPENDICULAR MAGNETIC RECORDING LAYER
- 50
- 44 — NON-MAGNETIC INTERMEDIATE LAYER
- 42 — FERROMAGNETIC INTERMEDIATE LAYER
- 30 — NON-MAGNETIC UNDERLAYER
- 20 — SOFT-MAGNETIC UNDERLAYER
- 10 — NON-MAGNETIC SUBSTRATE

PERPENDICULAR MAGNETIC RECORDING MEDIUM

BACKGROUND

1. Technical Field

The present invention relates to a perpendicular magnetic recording medium mounted in various kinds of magnetic recording devices. More particularly, the invention relates to a perpendicular magnetic recording medium mounted in a hard disc drive (HDD) used as an external storage device of a computer, audiovisual (AV) instrument, or the like.

2. Related Art

Since 1997, the recording density of a hard disk drive (HDD) has increased sharply at an annual rate of 60 to 100%. As a result of this kind of remarkable growth, an increase in density with the in-plane recording method used to date is nearing its limit. Given such circumstances, attention has focused in recent years on a perpendicular recording method whereby an increase in density is possible, and research into and development of the method has been vigorously pursued. Then, the long-awaited commercialization of an HDD employing the perpendicular recording method was started in 2005.

A perpendicular magnetic recording medium is configured mainly of a magnetic recording layer of a hard magnetic material, a underlayer for orienting the magnetic recording layer in an intended direction, a protective film that protects the surface of the magnetic recording layer, and an underlayer of a soft-magnetic material that performs a role of concentrating a magnetic flux emitted by a magnetic head used in a recording onto the magnetic recording layer.

In order to improve the basic characteristics of a magnetic recording medium, it is necessary to improve the signal-to-noise ratio (SNR). That is, it is necessary to increase the signal output from the magnetic recording medium, and reduce the noise. One cause of a decrease in signal output and an increase in noise is an increase in the orientational dispersion (variation in crystal orientation) of the magnetic recording layer. With the perpendicular magnetic recording medium, it is necessary to orient the easy magnetization axis of the magnetic recording layer perpendicular to the medium plane, at which time, in the event that the orientational dispersion of the easy magnetization axis increases, the signal output decreases due to a decrease in the magnetic flux in the perpendicular direction. Also, results obtained from the investigations of the inventors show that, with a medium with a large orientational dispersion, the magnetic isolation between crystal particles decreases, the magnetic cluster size increases, and the noise increases (refer to Non-patent Document 1: Shunji Takenoiri, Yasushi Sakai, Kazuo Enomoto, Sadayuki Watanabe, Hiroyuki Uwazumi, "Development and Issues of CoPtCr—SiO$_2$ Perpendicular Recording Media", material from 135$^{th}$ Research Conference on Magnetics (Mar. 12, 2004)).

Also, there has been proposed a perpendicular magnetic recording medium wherein a two-layer underlayer of a Fe, Cr, or Co alloy and Ru is disposed between the magnetic recording layer and soft-magnetic underlayer with the object of improving the magnetic characteristics, and improving the electromagnetic conversion characteristics by a decrease in the noise caused by the soft-magnetic underlayer (refer to JP-A-2002-100030). Also, in order to achieve the object, there has been proposed a perpendicular magnetic recording medium wherein a soft-magnetic underlayer formed from a CoFe alloy, and a Ru underlayer between the magnetic recording layer and the soft-magnetic underlayer, are disposed (refer to JP-A-2002-298323).

Also, there has been proposed a perpendicular magnetic recording medium wherein a underlayer formed from a soft-magnetic permalloy based material, and a non-magnetic intermediate layer having a comparatively large film thickness formed from Ru or a Ru based alloy, are disposed between the soft-magnetic underlayer and the magnetic recording layer, with an object of decreasing the orientational dispersion in the magnetic recording layer, reducing an initial growth layer, reducing crystal particle diameter, and the like (refer to JP-A-2002-358617 and JP-A-2003-123239). Furthermore, it has been proposed that, in the perpendicular magnetic recording medium wherein the soft-magnetic underlayer, the underlayer formed of a soft-magnetic permalloy based material, the intermediate layer of Ru or a Ru based alloy material, and the magnetic recording layer are disposed, a reduction in the film thickness of the intermediate layer, as well as an increase in the coercivity and squareness ratio of the magnetic recording layer, and an improvement in the recording signal SNR for the recording density employed to date, are realized by inserting a soft-magnetic Co layer or a soft-magnetic Co based alloy layer between the underlayer and intermediate layer (refer to JP-A-2004-288348).

Furthermore, there has been proposed a perpendicular magnetic recording medium of a configuration wherein the magnetic recording layer is divided into first and second perpendicular magnetic films, and a sub-film and non-magnetic intermediate film are inserted between the magnetic films, with an object of improving noise characteristics and thermal fluctuation tolerance (refer to JP-A-2001-101643). In this configuration, the first and second perpendicular magnetic films are magnetically coupled. The object of the configuration is to prevent a magnetization fluctuation of the second perpendicular magnetic film by making the magnetic anisotropic energy of the first perpendicular magnetic film, which is the lower layer, greater than the magnetic anisotropic energy of the second perpendicular magnetic film, which is the upper layer, and to reduce noise by making the recording domain boundaries of the second perpendicular magnetic film linear. Also, with this configuration, it is possible to improve the thermal fluctuation tolerance by employing the first perpendicular magnetic film with the larger perpendicular magnetic anisotropic energy.

Also, there has been proposed a perpendicular magnetic recording medium wherein a first underlayer, a first non-magnetic intermediate layer, a second underlayer, and a second non-magnetic intermediate layer are disposed between the soft-magnetic underlayer and the magnetic recording layer, the first underlayer being formed of a material having an fcc structure including at least Ni and Fe, and the second underlayer being formed of a soft-magnetic material having an fcc structure including at least Co, with an object of improving the noise characteristics and SNR (refer to JP-A-2008-117506). With this configuration, by providing the stacked structure of the first non-magnetic intermediate layer, the second underlayer, and the second non-magnetic intermediate layer, the crystal growth of each of these layers is curbed, and the crystal particle diameter of each layer is miniaturized. As a result of this, the effect of the crystal particle diameter miniaturization provided by the first underlayer formed of a material having an fcc structure including at least Ni and Fe is utilized in the miniaturization of the crystal particle diameter of the magnetic recording layer.

However, with the aim of yet higher recording density, there still exists a demand for a perpendicular magnetic recording medium with which it is possible to realize a high signal output and low noise, and achieve a high SNR, even at a time of a high density recording.

In order to realize a high SNR by increasing the signal output and reducing the noise of a perpendicular magnetic recording medium, it is necessary to make the orientational dispersion of the magnetic recording layer as small as possible.

In addition to the above-mentioned point, it is necessary to reduce the crystal particle diameter of the magnetic recording layer in order to lower the noise of the magnetic recording medium. This is because, in the event that the crystal particle diameter of the magnetic recording layer increases, the bit transition region becomes irregular, and transition noise increases. Consequently, it is necessary to decrease the transition noise by reducing the crystal particle diameter and making the bit transition region linear. With regard to this point, it is known that the underlayer or intermediate layer has a function of controlling the crystallinity, orientation, crystal particle diameter, and the like, of the magnetic recording layer formed on the underlayer or intermediate layer, and affects the characteristics of the magnetic recording layer. In particular, when forming the magnetic recording layer on the underlayer or intermediate layer using epitaxial growth, the crystal particle diameter of the magnetic recording layer complies with the crystal particle diameter of the material of the underlayer or intermediate layer. Consequently, in order to reduce the crystal particle diameter of the magnetic recording layer, it is effective to reduce the crystal particle diameter of the underlayer or intermediate layer.

Furthermore, from the point of view of improving the recording density of the perpendicular magnetic recording medium, it is necessary to reduce the noise in the bit transition region. In order to do this, it is effective to secure a precipitous recording magnetic field, and make the transition as linear as possible. Herein, in order to obtain a precipitous recording magnetic field, it is necessary to make the distance between the soft-magnetic underlayer and the magnetic head as small as possible. Also, as the recording magnetic field of the magnetic head decreases as the recording density increases, it is also necessary to reduce the distance between the soft-magnetic underlayer and the magnetic head in order to secure a sufficient recording magnetic field. Generally, a non-magnetic underlayer and/or intermediate layer is provided between the magnetic recording layer and soft-magnetic underlayer. However, at present, the non-magnetic underlayer and/or intermediate layer has a film thickness of around 20 to 30 nm, and this large film thickness is a cause of increasing the distance between the soft-magnetic underlayer and the magnetic head. Actually, in the configurations presently proposed as heretofore described, the non-magnetic underlayer and/or intermediate layer has a large film thickness (for example, 35 nm or more in the configurations described in JP-A-2002-100030 and JP-A-2002-298323), and is insufficient with regard to reducing the distance between the magnetic head and the soft-magnetic underlayer, and obtaining a high SNR at a time of a high density recording.

However, it is known that, when reducing the film thickness of the underlayer or intermediate layer, a decrease in the crystal orientation of the magnetic recording layer material and a deterioration of magnetic isolation between magnetic crystal particles occur, and the magnetic characteristics of the magnetic recording layer decrease. Considering the above point, it is necessary, rather than simply reducing the film thickness, to carry out a reduction of the film thickness of the underlayer or intermediate layer while maintaining or improving the magnetic characteristics of the magnetic recording layer.

SUMMARY

Consequently, in accordance with one aspect of the invention, provision is made for a perpendicular magnetic recording medium with which it is possible to effectively reduce the film thickness of the underlayer or intermediate layer without decreasing the magnetic characteristics of the magnetic recording layer, thereby enabling an improvement in performance, such as a lowering of noise, an SNR improvement, and an improvement in writability.

It has been found that, with a configuration having a non-magnetic underlayer formed from a non-magnetic metal film of a face-centered cubic (fcc) structure, a hexagonal close packing (hcp) structure, or an amorphous structure, and a ferromagnetic intermediate layer disposed on the non-magnetic underlayer, it is possible to reduce the effective thickness of the non-magnetic intermediate layer while maintaining the magnetic characteristics of the magnetic recording layer when setting a value Bs·t, wherein a saturation magnetic flux density Bs (typically measured in Tesla, or T) of the ferromagnetic intermediate layer is multiplied by a film thickness t (typically measured in nanometers, or nm), within a range of 0.15 to 3.6 T·nm. Also, it has been found that it is possible, using the heretofore described method, to simultaneously realize an improvement in the performance of the perpendicular magnetic recording medium, such as a reduction of medium noise, an SNR improvement, and an improvement in writability.

A perpendicular magnetic recording medium according to one aspect of the invention includes at least a soft-magnetic underlayer, a non-magnetic underlayer, a ferromagnetic intermediate layer, a non-magnetic intermediate layer, and a perpendicular magnetic recording layer sequentially stacked on a non-magnetic substrate, wherein the ferromagnetic intermediate layer is formed of a CoCr based alloy, a product Bs·t of a saturation magnetic flux density Bs and film thickness t of the ferromagnetic intermediate layer is within a range of 0.15 to 3.6 T·nm, and the non-magnetic intermediate layer has a film thickness of 3 nm or more.

Herein, it is preferable that the non-magnetic underlayer is formed of a non-magnetic metal having an fcc structure or an hcp structure, or formed of a non-magnetic metal having an amorphous structure. Also, it is desirable that the non-magnetic underlayer is formed of an alloy including at least one kind of metal selected from a group including Ni, Co, and Cr.

By employing the above-described kind of configuration, it is possible to reduce the effective film thickness of the non-magnetic intermediate layer while maintaining the magnetic isolation of the magnetic crystal particles in the magnetic recording layer. Because of this, a perpendicular magnetic recording medium is obtained with which it is possible to simultaneously achieve a reduction of medium noise, an SNR improvement, and an improvement in writability by reducing the distance between the soft-magnetic underlayer and the magnetic head.

DETAILED DESCRIPTION

Figure 1:
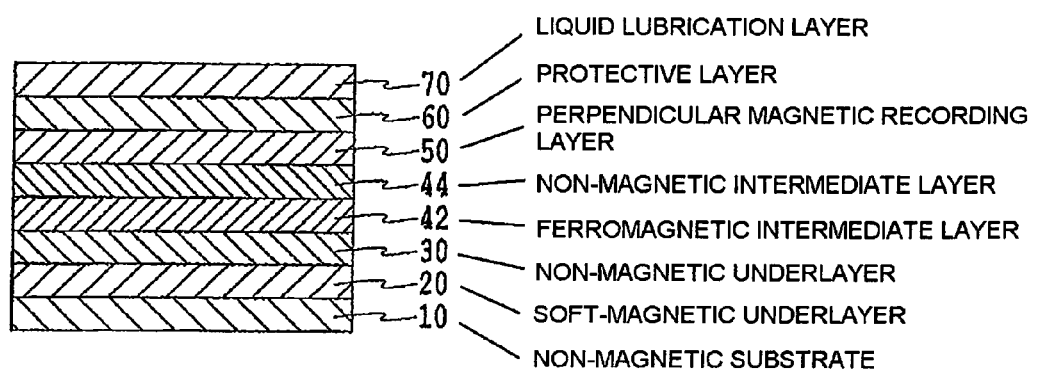
FIG. 1 is a sectional schematic view of a perpendicular recording medium according to an aspect of the invention.

Hereafter a description will be given, referring to the drawings, of embodiments of the invention. FIG. 1 is a sectional schematic view for illustrating a perpendicular recording medium in accordance with one aspect of the invention. As shown in FIG. 1, the perpendicular recording medium according to the invention includes a non-magnetic substrate 10, a soft-magnetic underlayer 20, a non-magnetic underlayer 30, a ferromagnetic intermediate layer 42, a non-magnetic intermediate layer 44, a perpendicular magnetic recording layer 50, a protective layer 60, and a liquid lubrication layer 70. Of these layers, the protective layer 60 and liquid lubrication layer 70 are layers which can be disposed when necessary.

Various bases with smooth surfaces, known to those skilled in the art, can be used as the non-magnetic substrate 10. For example, it is possible to use an Al alloy treated with a NiP plating, reinforced glass, quartz glass, or the like, used for a magnetic recording medium, as the non-magnetic substrate 10.

The soft-magnetic underlayer 20 can be formed using a crystalline material like FeTaC or a sendust (FeSiAl) alloy, or an amorphous material including a Co alloy like CoZrNb or CoTaZr. The optimum value of the film thickness of the soft-magnetic underlayer 20 changes depending on the structure and characteristics of the magnetic head used in a recording. However, from the point of view of productivity, it is desirable that the soft-magnetic underlayer 20 has a film thickness of roughly 10 nm or more, 500 nm or less.

The non-magnetic underlayer 30 can be formed using a non-magnetic metal having a face-centered cubic (fcc) structure or hexagonal close packing (hcp) structure. It is possible to use a Co alloy or a Ni alloy as a non-magnetic metal having an fcc structure or hcp structure. When using these materials, it is possible to give the non-magnetic underlayer 30 a function of controlling the crystal orientation of the layer formed above the non-magnetic underlayer 30. Alternatively, the non-magnetic underlayer 30 can be formed using a non-magnetic metal having an amorphous structure. It is possible to use a Cr alloy like CrTi, CrB, or CrTa as a non-magnetic metal having an amorphous structure. In any case, the non-magnetic underlayer 30 has a film thickness within a range of 1 nm or more, 30 nm or less, and more preferably 2 nm or more, 15 nm or less. It is desirable that the non-magnetic underlayer 30 is formed in contact with the soft-magnetic underlayer 20.

The ferromagnetic intermediate layer 42 used in the invention is formed of a CoCr based alloy. In order to have ferromagnetism, it is desirable that the amount of Cr included in the CoCr based alloy, with the total number of atoms as a reference, is 33% or less of the atoms. The ferromagnetic intermediate layer 42 of the invention formed of a CoCr based alloy has an hcp structure or an fcc structure.

In the invention, it is necessary that a product Bs·t of a saturation magnetic flux density Bs and a film thickness t of the ferromagnetic intermediate layer 42 is within a range of 0.15 to 3.6 T·nm. When the Bs·t of the ferromagnetic intermediate layer 42 is lower than 0.15 T·nm, the writability of a perpendicular magnetic recording medium decreases. Conversely, when the Bs·t of the ferromagnetic intermediate layer 42 is higher than 3.6 T·nm, it leads to a depreciation of the SNR of the perpendicular magnetic recording medium. This is because of the increasing effect of the ferromagnetic intermediate layer 42 as a DC noise source. For such reasons, it is thought that it is possible to achieve both of the writability and SNR in the perpendicular magnetic recording medium by having the Bs·t of the ferromagnetic intermediate layer 42 within the range of 0.15 to 3.6 T·nm.

The non-magnetic intermediate layer 44 may be a single-layer film formed using Ru, Re, or an alloy having one of these as a main element. Alternatively, the non-magnetic intermediate layer 44 may be a stacked film configured of a lower layer formed of a Co alloy like CoCr (the amount of Cr included exceeds 33% of the atoms, with the total number of atoms as a reference) showing non-magnetism, or of a Ni alloy, and an upper layer formed using Ru, Re, or an alloy having one of these as a main element.

The non-magnetic intermediate layer 44 has a film thickness of 3 nm or more, preferably 3 nm or more, 30 nm or less, and more preferably within a range of 3 nm or more, 20 nm or less. By having the film thickness within such a range, it is possible to give the perpendicular magnetic recording layer 50 the characteristics necessary for a high density recording, without causing a depreciation of the magnetic characteristics and electromagnetic conversion characteristics of the perpendicular magnetic recording layer 50. When the film thickness of the non-magnetic intermediate layer is made less than 3 nm, a magnetic coupling occurs between the ferromagnetic intermediate layer 42 and perpendicular magnetic recording layer 50, and the SNR characteristics decrease. Conversely, when the film thickness of the non-magnetic intermediate layer is made more than 30 nm, the distance between the soft-magnetic underlayer 20 and perpendicular magnetic recording layer 50 increases, and the function (the function of concentrating a magnetic flux emitted by the magnetic head in the perpendicular magnetic recording layer 50) of the soft-magnetic underlayer 20 declines.

The perpendicular magnetic recording layer 50 can preferably be formed using a ferromagnetic material of an alloy including at least Co and Pt. In order to use the magnetic recording medium of the invention as a perpendicular magnetic recording medium, it is necessary that the easy magnetization axis (the c axis of a hexagonal close packing (hcp) structure) of the material of the perpendicular magnetic recording layer 50 is oriented in a direction perpendicular to the surface of the non-magnetic substrate 10. For example, a single-layer film of an alloy material such as CoPt, CoCrPt, CoCrPtB, or CoCrPtTa, or a multi-layer stacked film, such as an alternately stacked film of Co films and Pt films ($(Co/Pt)_n$) or an alternately stacked film of Co films and Pd films ($[Co/Pd]_n$), can be used as the perpendicular magnetic recording layer 50.

Alternatively, it is further preferable to form the perpendicular magnetic recording layer 50, configured of a single layer or multiple layers, using a material having a granular structure wherein magnetic crystal particles are dispersed in a matrix of a non-magnetic oxide or non-magnetic nitride. Materials having a granular structure that can be used include, but are not limited to, $CoPt—SiO_2$, CoCrPtO, $CoCrPt—SiO_2$, $CoCrPt—TiO_2$, $CoCrPt—Al_2O_3$, CoPt—AlN, $CoCrPt—Si_3N_4$ and the like. In accordance with one aspect of the invention, by using a material having a granular structure, it is possible to promote magnetic separation between adjacent magnetic crystal particles in the perpendicular magnetic recording layer 50, and achieve improvements in medium characteristics, such as noise reduction, SNR improvement and recording resolution improvement.

The film thickness of the perpendicular magnetic recording layer 50 is not particularly limited. However, from the points of view of productivity and high density recording, the perpendicular magnetic recording layer 50 can preferably have a film thickness of 40 nm or less, and more preferably 20 nm or less.

The protective layer 60, which can optionally be provided, is a layer for protecting layers under the protective layer 60, i.e. each layer of the configuration from the perpendicular magnetic recording layer 50 and below. It is possible to use, for example, a thin film having carbon as a main element as the protective layer 60. Apart from this, the protective layer 60 may be formed using various kinds of thin film material known to those skilled in the art as materials for a magnetic recording medium protective layer.

The liquid lubrication layer 70, which can optionally be provided, is a layer for providing lubrication when the read/write head floats above, or comes into contact with, the magnetic recording medium. The liquid lubrication layer 70 can be formed using, for example, a perfluoropolyether based liquid lubrication agent, or various kinds of liquid lubrication agent material known to those skilled in the art.

Each layer stacked on the non-magnetic substrate 10 can be formed by means of various depositing techniques commonly used in the field of magnetic recording media. It is possible to use, for example, sputtering methods (including a DC magnetron sputtering method, an RF magnetron sputtering method, and the like), or a vacuum deposition method in the formation of each layer from the soft-magnetic underlayer 20 to the protective layer 60. Also, it is also possible to use, in addition to the previously mentioned methods, a plasma CVD method in the formation of the protective layer 60, which has carbon as a main element. Meanwhile, it is possible to use, for example, a dipping method or a spin coating method in the formation of the liquid lubrication layer 70.

A magnetic domain control layer (not shown in FIG. 1) that controls the magnetic domain of the soft-magnetic underlayer 20 may optionally be provided between the non-magnetic substrate 10 and soft-magnetic underlayer 20. Alternatively, an adhesion layer (not shown in FIG. 1) that improves the adhesion between the non-magnetic substrate 10 and soft-magnetic underlayer 20 may be provided.

With the perpendicular magnetic recording medium of the invention, as the product Bs·t of the saturation magnetic flux density Bs and film thickness t of the ferromagnetic intermediate layer 42 is controlled, it is possible to realize a high signal output and low noise even at a time of a high density recording, and to achieve a high SNR and high writability.

EXAMPLES

Example 1

A chemically reinforced glass substrate with a smooth surface (a HOYA N-5 glass substrate) is cleaned, and used as the non-magnetic substrate 10. The non-magnetic substrate 10 is introduced into a DC magnetron sputtering device and, using a Co3Zr5Nb (configured of 3% Zr, 5% Nb, and the remainder Co, with the total number of atoms as a reference; the same applying hereafter) target in an Ar gas at a pressure of 0.67 Pa, the CoZrNb amorphous soft-magnetic underlayer 20 with a film thickness of 40 nm is deposited. Next, using a Ni25Cr target in an Ar gas at a pressure of 0.67 Pa, the Ni25Cr non-magnetic underlayer 30 with a film thickness of 6 nm is deposited. The Ni25Cr film obtained is non-magnetic, and has an fcc structure.

Next, using a Co25Cr target in an Ar-4% $N_2$ gas at a pressure of 0.67 Pa, the Co25Cr ferromagnetic intermediate layer 42 with a film thickness of 2 nm is deposited. Herein, the saturation magnetic flux density Bs of the Co25Cr ferromagnetic intermediate layer 42 measured with an oscillating magneto-meter is approximately 0.39 T. The Co25Cr ferromagnetic intermediate layer 42 obtained has an hcp structure.

Subsequently, using a Co35Cr target in an Ar-4% $N_2$ gas at a pressure of 0.67 Pa, a Co35Cr film with a film thickness of 10 nm is deposited as the lower layer of the non-magnetic intermediate layer 44. The Co35Cr lower layer obtained has an fcc structure. Subsequently, using a Ru target in an Ar gas at a pressure of 4.0 Pa, a Ru film with a film thickness of 8 nm is deposited as the upper layer of the non-magnetic intermediate layer 44.

Subsequently, the perpendicular magnetic recording layer 50 with the two-layer configuration is deposited. Firstly, using a 92 (Co12Cr18Pt)-8Sio$_2$ target at a pressure of 5.3 Pa, a CoCrPt—SiO$_2$ first magnetic recording layer with a film thickness of 8 nm is deposited. Next, using a 96 (Co20Cr12Pt)-4SiO$_2$ target at a pressure of 1.2 Pa, a CoCrPt—SiO$_2$ second magnetic recording layer with a film thickness of 8 nm is deposited, and the perpendicular magnetic recording layer 50 with a total film thickness of 16 nm is obtained. Next, using a plasma CVD method with ethylene as a material gas at a pressure of 0.13 Pa, the protective film 60 configured of carbon with a film thickness of 4 nm is deposited. The layered body in which the protective layer 60 and under are formed is removed from the vacuum device. Finally, the liquid lubrication layer 70 configured of perfluoropolyether with a film thickness of 2 nm is formed using a dipping method on the protective layer 60, and the perpendicular magnetic recording medium is obtained.

Examples 2 to 6, Comparison Examples 1 and 2

In each example, the total film thickness of the Co25Cr ferromagnetic intermediate layer 42 and the Co35Cr film which is the lower layer of the non-magnetic intermediate layer 44 is fixed at 12 nm. Except that the film thicknesses of the Co25Cr ferromagnetic intermediate layer 42 and Co35Cr film are changed as shown in Table 1, the perpendicular magnetic recording media are obtained by repeating the procedure of Example 1. The product Bs·t of the saturation magnetic flux density Bs and film thickness t of the Co25Cr ferromagnetic intermediate layer 42 is also shown in Table 1.

TABLE 1

Film thickness and Bs · t of ferromagnetic intermediate layer 42, and film thickness of lower layer of non-magnetic intermediate layer 44

| | Ferromagnetic Intermediate Layer 42 (Co25Cr) Film Thickness (nm) | Non-magnetic Intermediate Layer 44 Lower Layer (Co35Cr) Film Thickness (nm) | Ferromagnetic Intermediate Layer 42 Bs · t (T · nm) |
|---|---|---|---|
| Example 1 | 2 | 10 | 0.78 |
| Example 2 | 3 | 9 | 1.17 |
| Example 3 | 4 | 8 | 1.56 |
| Example 4 | 5 | 7 | 1.95 |
| Example 5 | 6 | 6 | 2.34 |
| Example 6 | 9 | 3 | 3.51 |
| Comparison Example 1 | 0 | 12 | 0.00 |
| Comparison Example 2 | 12 | 0 | 4.68 |

Examples 7 to 9

In each example, except that (a) a ferromagnetic intermediate layer 42 configured of a CoCr alloy wherein the relative proportion of Cr is changed from 28% of the atoms to 32% of the atoms and having a film thickness of 12 nm is formed, and (b) the Co35Cr film of the lower layer of the non-magnetic intermediate layer 44 is omitted, and the non-magnetic intermediate layer 44 is made a single-layer film having a film thickness of 8 nm, the perpendicular magnetic recording media are obtained by repeating the procedure of Example 1. The composition of the CoCr ferromagnetic intermediate layer 42, the saturation magnetic flux density Bs, and the product Bs·t of the saturation magnetic flux density Bs and film thickness t are shown in Table 2.

TABLE 2

Composition of ferromagnetic intermediate layer 42, saturation magnetic flux density Bs, and Bs · t

| | Ferromagnetic Intermediate Layer 42 Characteristics | | |
|---|---|---|---|
| | Composition | Saturation Magnetic Flux Density Bs (T) | Bs · t (T · nm) |
| Example 7 | Co28Cr | 0.068 | 0.82 |
| Example 8 | Co30Cr | 0.025 | 0.30 |
| Example 9 | Co32Cr | 0.014 | 0.17 |

Evaluation

A coercivity Hc is measured using a Kerr effect measurement device for the perpendicular magnetic recording media obtained in the examples and comparison examples. Furthermore, the SNR, medium noise, and overwrite (O/W) characteristics of each perpendicular magnetic recording medium are measured using a read/write tester. The SNR and medium noise evaluations are carried out using a signal with a recording density of 510 kfci. The medium noise is shown as a value normalized with respect to the signal output. The OW is evaluated as a value obtained by, firstly, recording a first signal with a recording density of 510 kfci in a track, measuring a signal output (T1) of the signal, then overwriting with a second signal with a recording density of 68 kfci in the same track, measuring a remaining signal output (T2) of the first signal after the overwriting, and calculating from the following equation ("log" indicates a common logarithm).

$$OW = -20 \times \log(T2/T1) \text{(unit:dB)}$$

An OW wherein a high density recording signal is overwritten with a low density recording signal in this way is called a reverse overwrite, and is an index whereby the writability in the perpendicular magnetic recording medium can be clearly evaluated.

The results of the evaluations of the magnetic characteristics (the coercivity Hc) and electromagnetic conversion characteristics (the SNR, medium noise (normalized value), and O/W (overwritability)) of the perpendicular magnetic recording media of Examples 1 to 9 and Comparison Examples 1 and 2 are shown in Table 3.

TABLE 3

Magnetic characteristics and electromagnetic conversion characteristics of perpendicular magnetic recording media

| | Magnetic Characteristics Hc*1 | Electromagnetic Conversion Characteristics | | |
|---|---|---|---|---|
| | | SNR (dB) | Medium Noise (Normalized Value) | O/W (dB) |
| Example 1 | 5032 (400.4) | 12.85 | 0.247 | 35.75 |
| Example 2 | 5030 (400.3) | 12.78 | 0.251 | 36.04 |
| Example 3 | 4967 (395.3) | 12.87 | 0.250 | 37.06 |
| Example 4 | 4936 (392.8) | 12.80 | 0.253 | 37.70 |
| Example 5 | 4966 (395.2) | 12.73 | 0.257 | 38.16 |
| Example 6 | 5027 (400.0) | 12.44 | 0.284 | 39.47 |
| Comparison Example 1 | 5097 (405.6) | 12.37 | 0.254 | 33.77 |
| Comparison Example 2 | 5059 (402.6) | 12.21 | 0.311 | 41.33 |
| Example 7 | 5078 (404.1) | 12.68 | 0.250 | 35.6 |
| Example 8 | 5043 (401.3) | 12.64 | 0.248 | 34.7 |
| Example 9 | 5114 (407.0) | 12.54 | 0.253 | 34.0 |

*1: unit Oe; the figures in brackets show the value when converted to a unit of kA/m.

Hereafter, Examples 1 to 9, in which the product Bs·t of the saturation magnetic flux density Bs and film thickness t of the ferromagnetic intermediate layer 42 is within the range of the invention, will be compared with Comparison Examples 1 and 2, in which Bs·t is outside the range of the invention. In Examples 1 to 9 and Comparison Examples 1 and 2, the coercivity Hc is adjusted so as to have approximately the same value. The behavior of the O/W, medium noise, and SNR (signal-to-noise ratio) accompanying the change in Bs·t is shown in FIGS. 2, 3 and 4 respectively.

Figure 2:
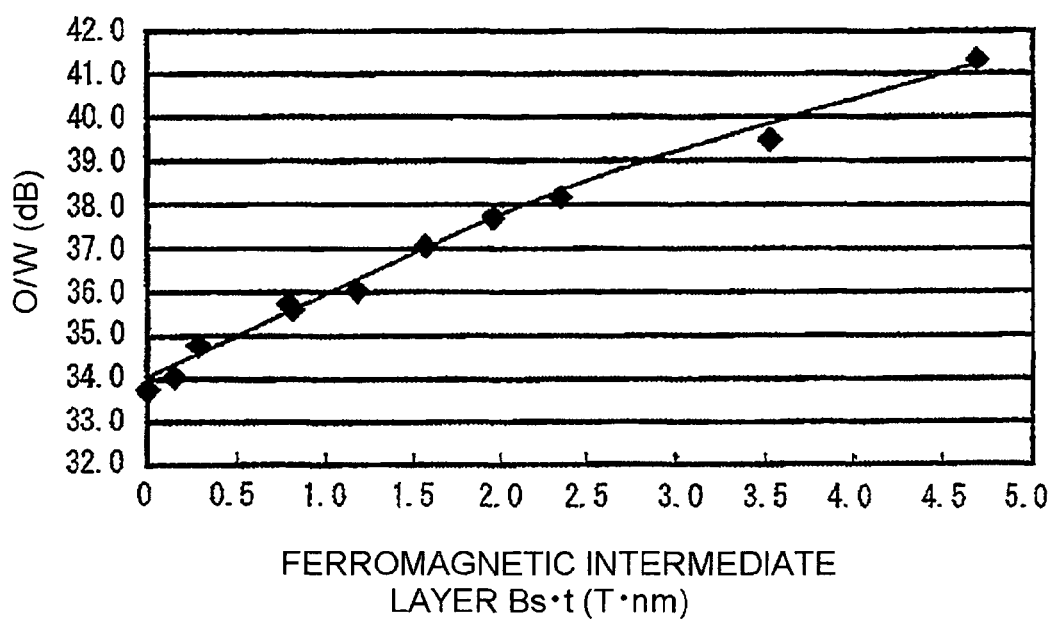
FIG. 2 is a graph representing a relationship between a Bs·t of a ferromagnetic intermediate layer and an O/W.
Figure 3:
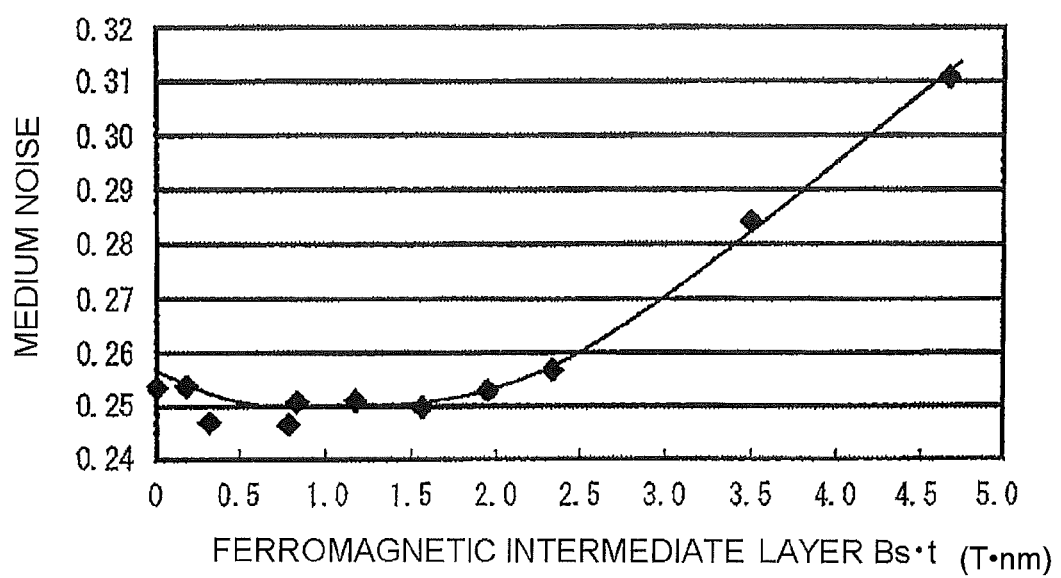
FIG. 3 is a graph representing a relationship between the Bs·t of the ferromagnetic intermediate layer and medium noise.

From FIG. 2, it can be seen that the O/W value rises, and the writability improves, along with an increase in Bs·t. However, from FIG. 3 it can be seen that an increase in the medium noise starts on Bs·t becoming larger than 2 T·nm. From these results, it can be seen that the improvement of the writability and the increase in the medium noise exhibit differing behavior.

Figure 4:
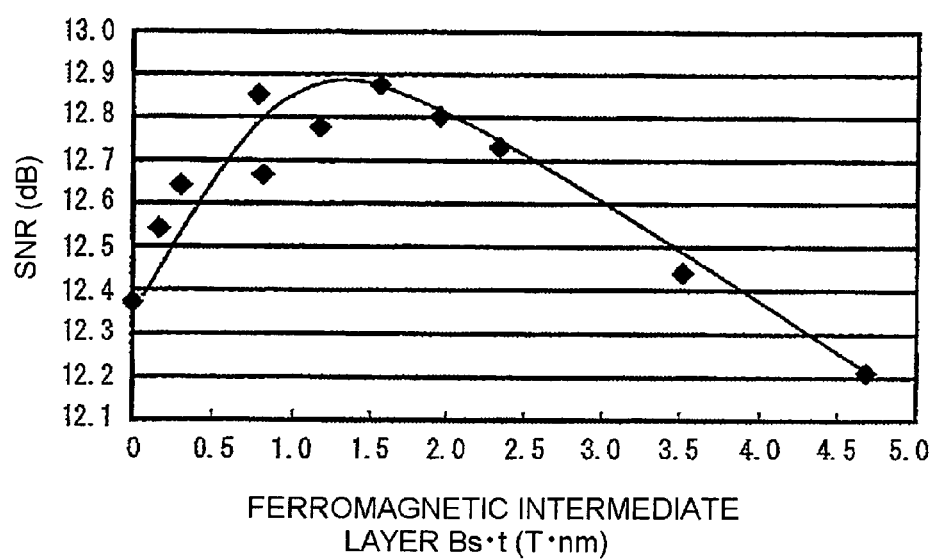
FIG. 4 is a graph representing a relationship between the Bs·t of the ferromagnetic intermediate layer and an SNR.

Meanwhile, from the behavior of the SNR accompanying the change in Bs·t shown in FIG. 4, it can be seen that the SNR is improved by the insertion of the ferromagnetic intermediate layer 42. However, a decrease in the SNR is recognized in the region in which Bs·t is 2 T·nm or more, in which the increase in the medium noise starts.

From the above results, it can be seen that an SNR improvement, a writability (O/W) improvement, and a decrease in medium noise are achieved when Bs·t is within the range of 0.15 to 3.6 (T·nm).

What is claimed is:

1. A perpendicular magnetic recording medium comprising:
   a non-magnetic substrate;
   a homogeneous soft-magnetic underlayer;
   a non-magnetic underlayer;
   a homogeneous ferromagnetic intermediate layer;
   a non-magnetic intermediate layer;
   a perpendicular magnetic recording layer,
   wherein the soft-magnetic underlayer, the non-magnetic underlayer, the ferromagnetic intermediate layer, the non-magnetic intermediate layer, and the perpendicular magnetic recording layer are sequentially stacked on the non-magnetic substrate, with the soft-magnetic underlayer contacting the non-magnetic substrate, the non-magnetic underlayer contacting the soft-magnetic underlayer, the ferromagnetic intermediate layer contacting the non-magnetic underlayer, the non-magnetic intermediate layer contacting the ferromagnetic intermediate layer, and the perpendicular magnetic recording layer contacting the non-magnetic intermediate layer, and wherein the ferromagnetic intermediate layer is formed of a CoCr-based alloy, a product (Bs·t) of a saturation magnetic flux density and film thickness of the ferromagnetic intermediate layer is within a range of 0.15 to 3.6 T·nm, and the non-magnetic intermediate layer has a film thickness of 3 nanometers or more.

2. The perpendicular magnetic recording medium according to claim 1, wherein the non-magnetic underlayer is formed of an alloy including a metal selected from the group consisting of Nickel (Ni), Cobalt (Co), and Chromium (Cr).

3. The perpendicular magnetic recording medium according to claim 1, wherein the non-magnetic underlayer is formed of a non-magnetic metal having a face-centered cubic (fcc) structure or a hexagonal close packing (hcp) structure.

4. The perpendicular magnetic recording medium according to claim 3, wherein the non-magnetic underlayer is formed of an alloy including a metal selected from the group consisting of Nickel (Ni), Cobalt (Co), and Chromium (Cr).

5. The perpendicular magnetic recording medium according to claim 1, wherein
the non-magnetic underlayer is formed of a non-magnetic metal having an amorphous structure.

6. The perpendicular magnetic recording medium according to claim 5, wherein the non-magnetic underlayer is formed of an alloy including a metal selected from the group consisting of Nickel (Ni), Cobalt (Co), and Chromium (Cr).

7. A magnetic recording medium comprising:
a soft-magnetic underlayer;
a non-magnetic underlayer;
a ferromagnetic intermediate layer;
a non-magnetic intermediate layer; and
a perpendicular magnetic recording layer,
wherein the soft-magnetic underlayer, the non-magnetic underlayer, the ferromagnetic intermediate layer, the non-magnetic intermediate layer, and the perpendicular magnetic recording layer are sequentially stacked, with the non-magnetic underlayer contacting the soft-magnetic underlayer and the ferromagnetic intermediate layer contacting the non-magnetic underlayer,
wherein the ferromagnetic intermediate layer is configured and arranged so that a product (Bs·t) of a saturation magnetic flux density (Bs) and film thickness (t) of the layer is within a range of 0.15 to 3.6 T·nm and so that the non-magnetic intermediate layer has a film thickness of 3 nm or more, and
wherein the non-magnetic underlayer is formed having a face centered cubic (fcc) structure or a hexagonal close packed (hcp) structure.

8. The magnetic recording medium according to claim 7, wherein the ferromagnetic intermediate layer is formed of a CoCr based alloy.

9. The magnetic recording medium according to claim 7, wherein the non-magnetic underlayer is formed of an alloy including a metal selected from the group consisting of Nickel (Ni), Cobalt (Co), and Chromium (Cr).

* * * * *